United States Patent
Jordan et al.

[15] 3,680,951
[45] Aug. 1, 1972

[54] PHOTOELECTRICALLY-CONTROLLED REAR-VIEW MIRROW

[72] Inventors: John F. Jordan; John W. Brean; Yervand Mathevosian, all of Cincinnati, Ohio

[73] Assignee: D. H. Baldwin Company, Cincinnati, Ohio

[22] Filed: April 1, 1970

[21] Appl. No.: 24,593

[52] U.S. Cl..................................350/281, 350/289
[51] Int. Cl..................................B60r 1/04
[58] Field of Search...............350/279–282, 289

[56] References Cited

UNITED STATES PATENTS

| | | | |
|---|---|---|---|
| 3,475,081 | 10/1969 | Russell | 350/279 |
| 3,510,205 | 5/1970 | Schiffman et al. | 350/279 |
| 3,075,430 | 1/1963 | Woodward et al. | 350/281 |

FOREIGN PATENTS OR APPLICATIONS

| | | | |
|---|---|---|---|
| 1,050,344 | 12/1966 | Great Britain | 350/281 |
| 1,131,236 | 10/1968 | Great Britain | 350/280 |

*Primary Examiner*—John K. Corbin
*Attorney*—W. H. Breunig and Hurvitz & Rose

[57] ABSTRACT

A photoelectrically controlled rear-view mirror employs a first photocell to switch the mirror between "normal" and "adjusted" positions in response to incident light on the mirror, and a second photocell to monitor ambient light and prevent switching of the mirror to the "adjusted" position during daylight hours and at night where high ambient light conditions exist. Mirror switching is effected by a single electromagnet having a winding which conducts current in one direction or the other in accordance with the resistive states of the photocells. The electromagnet displaces an actuating cam to either of two stable positions in which the mirror is positioned in an adjusted or a normal position, respectively.

25 Claims, 8 Drawing Figures

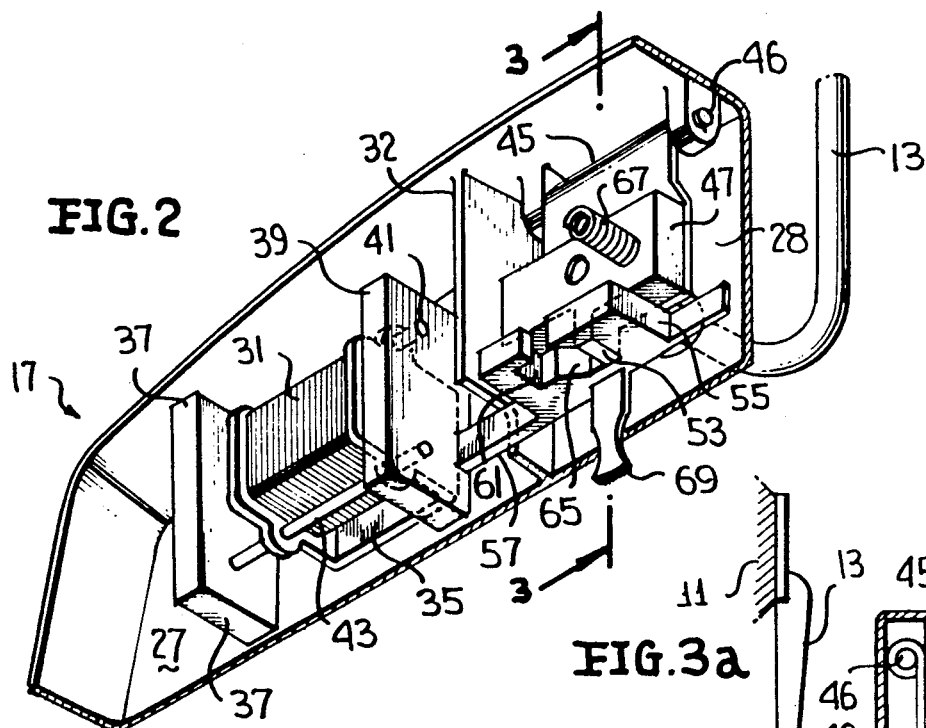
FIG. 2
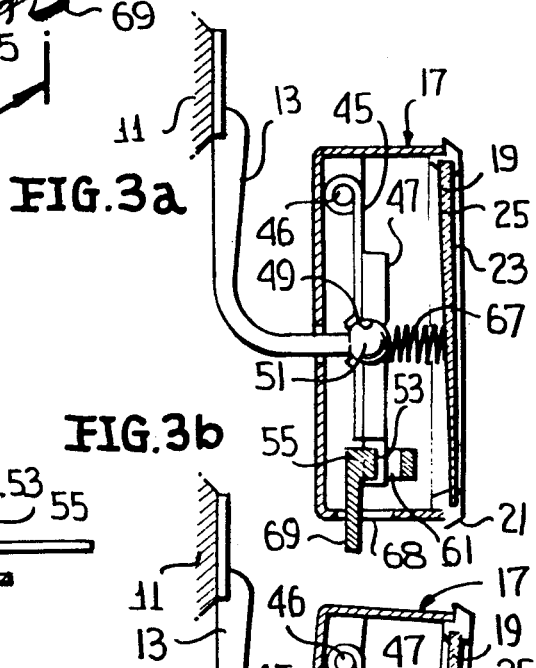
FIG. 3a
FIG. 3b
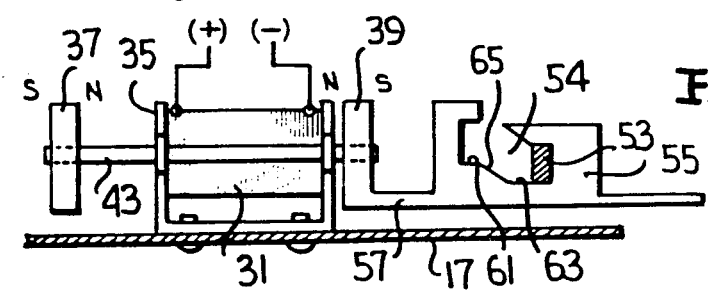
FIG. 4a
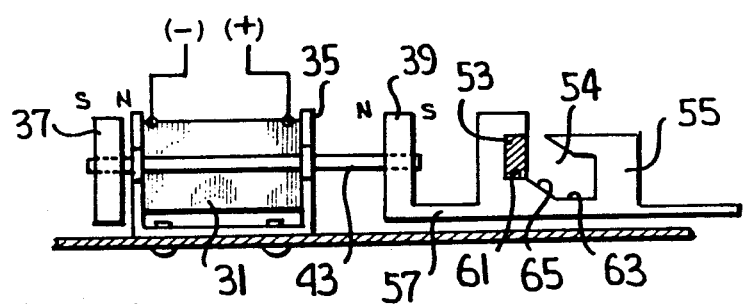
FIG. 4b
INVENTORS
JOHN F. JORDAN,
JOHN W. BREAN &
YERVAND MATHEVOSIAN

INVENTOR
JOHN F. JORDAN,
JOHN W. BREAN &
YERVAND MATHEVOSIAN

ATTORNEYS

PHOTOELECTRICALLY-CONTROLLED REAR-VIEW MIRROW

BACKGROUND OF THE INVENTION

The present invention relates to rear-view mirrors for motor vehicles and more particularly to photoelectrically controlled rear-view mirrors in which the mirror reflectivity is automatically adjusted to prevent reflected glare from impairing the vision of the motor vehicle operator or annoying the operator.

Photoelectrically controlled rear-view mirrors are known in the prior art. For example, the following U.S. Patents disclose mirrors which automatically adjust to prevent high intensity incident light from glaring in the eyes of the motor vehicle operator:

| U.S. Patent No. 3,000,262 | Rabinow et al. |
| U.S. Patent No. 3,059,539 | Meade |
| U.S. Patent No. 3,075,430 | Woodward et al. |
| U.S. Patent No. 3,152,216 | Woodward |
| U.S. Patent No. 3,307,899 | Rabinow |

Each of these prior art devices employs a conventional mirror panel which alternately provides a bright and a weak image in response to the incident light intensity at the reflecting surface. The mirror panel is automatically tilted to an "adjusted" position to provide a weak image when the intensity of incident light on the mirror surface is relatively high; likewise, the mirror panel is tilted to a "normal" position, wherein it provides a bright image, when the incident light intensity is relatively low. Automatic operation is accomplished by means of a photo-sensitive element responsive to the light intensity at the mirror to control current flow in an electrical circuit. The current flow determines the state of one or more actuating elements which position the mirror panel accordingly.

All prior art rear-view mirrors require adjustment to render them inactive during daylight hours and another adjustment to render them active at night. This is required to prevent daylight from switching the mirror to its "adjusted" position. In most cases this involves actuation of a switch to render the circuit active or not as desired. In some cases, the switch is eliminated and a sensitivity control, such as a potentiometer, must be adjusted at dawn and dusk to render automatic operation ineffective and effective, respectively.

It is an object of the present invention to provide a photoelectrically controlled rear-view mirror which is automatically rendered inactive during daylight hours and active at night.

It is another object of the present invention to provide a rear-view mirror which is controlled by two photocells, one sensing incident light on the mirror surface and the other sensing ambient light to prevent automatic switching of the mirror to its "adjusted" position during high ambient light conditions.

Most prior art mirrors mentioned above utilize electromagnets which respond to different control circuit conditions to provide operating forces necessary to effect mirror switching. The limited space available within the mirror housing dictates the need to minimize the number of electromagnets employed. Further, these electromagnets are usually energized for one mirror position and de-energized for the other so that in at least one position there is a simple mechanical detent but no magnetic force urging the mirror in place. As a consequence, these mirrors tend to jitter considerably when the motor vehicle is travelling over bumpy terrain.

It is therefore another object of the present invention to provide a photoelectrically controlled rear-view mirror in which a single electromagnet provides the switching forces and in which the mirror is held securely in both its "adjusted" and "normal" positions by both mechanical and magnetic forces.

SUMMARY OF THE INVENTION

In accordance with the principles of the present invention, an automatic rear-view mirror is selectively switched between its "normal" and "adjusted" positions by the action of a single electromagnet. A pair of permanent magnet armatures are switched between two positions in accordance with current direction through the electromagnet winding. A cam is secured to the armatures and acts to force the mirror into two mechanically detented positions corresponding to the armature positions.

Current flow through the electromagnet winding is controlled by two photocells, one arranged to sense the intensity of light impinging on the mirror, the other arranged to sense ambient light. When ambient light is above a predetermined selectable threshold level, current through the winding is constrained to that direction which forces the mirror to its "normal" position. When ambient light is below the selected threshold, current direction through the winding is determined by the light intensity sensed at the mirror surface.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings, wherein:

FIG. 2 is a fragmentary view in perspective of the mirror of FIG. 1;

FIG. 3a is a vertical sectional view of the mirror taken along lines 3—3 of FIG. 2 and illustrating the mirror in one of its two stable positions;

FIG. 3b is a vertical sectional view of the mirror taken along lines 3—3 of FIG. 2 and illustrating the mirror in the second of its two stable positions;

FIG. 4a is a diagrammatic illustration of the mirror of FIG. 2, indicating the position of the actuating mechanism for the mirror in response to current of one polarity flowing through the winding of the electromagnet;

FIG. 4b is similar to 4a, except that current of opposite polarity flows through the winding of the electromagnet;

DESCRIPTION OF PREFERRED EMBODIMENTS

Figure 1:
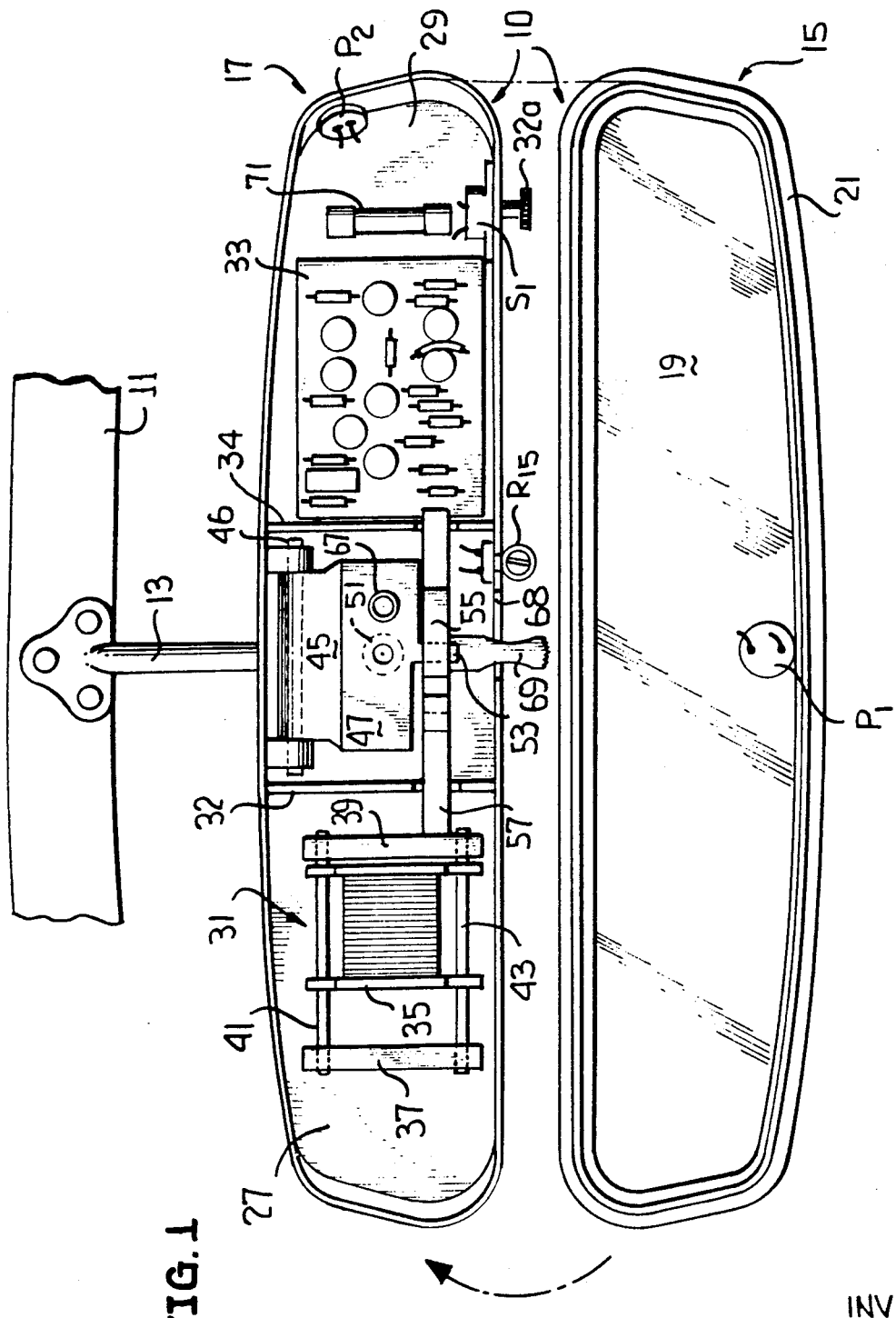
FIG. 1 is a front elevation view of a rear view mirror of the present invention with the mirror panel removed and flipped.

Referring to FIGS. 1, 2, 3a and 3b of the accompanying drawings, there is illustrated a mirror 10 secured to a motor vehicle frame 11 by means of a bracket 13. Mirror 10 includes a cover plate 15 arranged to fit over the front of component housing 17. Cover plate 15 includes a mirror panel or element 19 surrounded by a rubber or plastic gasket 21 which is adapted to snap-fit onto housing 17. Mirror element 19 may, for example, comprise a single prismoidal mirror body, well-known in the art, having front and rear surfaces 23 and 25 (FIGS. 3a, 3b) of differing reflectivity. Thus, in one position element 19 provides almost total light reflection to the eyes of the motorist and, in the other position significantly attenuates light thus reflected.

The intensity of light impinging upon the front of mirror panel 19 is sensed by a photocell $P_1$. The latter is affixed to the rear of panel 19 over a suitably provided window in the reflective coatings of surfaces 23, 25. As is well known, a photocell exhibits decreased electrical resistance with increased incident light intensity. This feature is utilized in conjunction with a control circuit described in relation to FIG. 5.

Component housing 17 is subdivided into three sections 27, 28 and 29. Section 27, disposed to the left-of-center of the mirror (as viewed by the motor vehicle operator) houses an electromagnet 31, the winding for which is supplied with current from a control circuit located on circuit board 33 and housed in section 29 of housing 17. Section 29 is located to the right-of-center of the housing and section 28 is substantially centrally located. Partitions 32, 34 separate the three housing sections.

The winding of electromagnet 31 is secured to a core 35 which in turn is secured to the rear wall of housing 17 by means of screws, adhesives or the like. A pair of permanent magnet armatures 37, 39 are disposed at opposite ends of electromagnet 31 and are joined by a pair of rods 41, 43 which are slidably supported by bracket 35 in two pairs of aligned apertures defined therein. Permanent magnets 37 and 39 have faces of like magnetic polarity (for example, North) facing one another. In this manner, for one direction of current flow through the winding of electromagnet 31, armature 37 is attracted toward and armature 39 repelled from the electromagnet core; for oppositely directed current flow in electromagnet winding, armature 37 is repelled from and armature 39 attracted toward the electromagnet core.

A mounting plate member 45 is rotatably mounted at 46 by means of a hinge or the like, on housing 17 adjacent the rear-upper corner of housing section 28. The axis about which mounting plate is pivotable relative to housing 17 extends horizontally and substantially parallel to panel 19. Plate 45 is constrained from moving along its pivot axis. A further plate 47 is secured to the front of the lower portion of mounting plate 45, remote from rotatable mounting 46, with adjacent surfaces of the two plates being suitably joined. The two plates 45, 47 cooperate to form a socket 49 therebetween, which socket receives a ball 51 secured to the end of bracket 13. For this purpose, a suitable hole is defined through the rear wall of housing 17 in section 28 to accommodate bracket 13.

A projection 53 of generally rectangular cross-section extends downwardly from the bottom of plate 47. Projection 53 extends into a cam slot 54 of a cam member 55 secured to an end of a connecting rod 57, extending from armature 39 through an appropriate aperture in partition 32. The rod 57 is translatable with armature 39 along an axis generally parallel to panel 19 and horizontal as viewed in FIG. 1.

The slot 54 of the cam member 55 lies in the horizontal plane and consists of three sections, a rectangular section 61 adjacent the mirror, a second rectangular section 63 remote from the mirror and displaced from section 61 along the direction of translation of the cam, and a section 65 providing a sloping or inclined path between the rectangular sections. The rectangular sections 61 and 63 of the slot are of such a size as to completely receive the rectangular projection 53 therein.

Referring to FIGS. 3a and 4a of the accompanying drawing, current is passing through the electromagnet winding in the direction indicated by the polarity markings in FIG. 4a, armature 39 is attracted toward the electromagnet and armature 37 is repelled therefrom. The attracting and repelling forces aid in holding the rod 57 to the left, in which condition projection 53 is engaged by section 63 of the slot in cam 55. In this position housing 17 assumes the position illustrated in FIG. 3a with reflecting surface 23 of mirror panel 19 effective relative to the field of view of the motor vehicle operator. The contour of section 63 of the cam slot acts as a mechanical detent to prevent relative motion between cam 55 and projection 53 and hence between plate 45 and housing 17. In addition, the continued magnetic attraction of armature 39 and repulsion of armature 37 assure that rod 57 cannot be translated to overcome the mechanical detent. Thus the mirror is stably held in this position by the combined actions of mechanical and electromagnetic detents, and the mirror may be adjusted by the driver without disturbing the day-night orientation of the apparatus. Even when current is not flowing in the coil, magnetic detent exists, since the permanent magnet adjacent to coil is attracted.

Assume now that current flow through the electromagnet winding is reversed, as indicated by the polarity markings in FIG. 4b. Armature 39 is now repelled from the core and armature 37 is attracted thereto, thereby translating rod 57 to the right. Translation of the rod 57 causes the cam 55 to move to the right in FIG. 4a so that the inclined surface of section 65 engages the projection 53 of the plate 47. Since the plate 47 is supported by the bracket 13 and therefore is rigid, the cam 55 must move relative to the projection 53. Specifically the force imparted to the cam 55 is transmitted through rod 57 and the electromagnet support structure to the housing 17 so that the housing 17 is caused to pivot about hinge 46 relative to plates 45 and 47. Thus projection 53, and hence plate 45, are urged closer to mirror panel 19. As indicated above, since motion of plate 45 relative to the motor vehicle is constrained, housing 17 is forced to pivot (clockwise as viewed in FIGS. 4a, 4b) about mounting 46 to the position illustrated in FIG. 4b. In this position reflecting surface 25 of mirror panel 19 is effective relative to the field of view of the vehicle operator. In this position, too, combined magnetic and mechanical detents coact to assure stable positioning of the mirror.

Cam 55 and projection 53 are preferably plastic or some other low-friction material which permits relatively free translation of the cam between its two positions when driven by the electromagnet. In addition, sections 61 and 63 of the cam slot may be slightly larger than projection 53 to prevent binding; in such case a compression spring 67 may be disposed to urge plate 45 rearwardly of panel 19 and thereby urge projection 53 against rear wall of the cam slot. This latter feature provides additional assurance that housing 17 does not move relative to the vehicle in response to bumps experienced by the vehicle.

Cam 55 may be additionally provided with a finger-like projection 69 which extends downwardly from the cam and through a suitably provided aperture 68 at the bottom of housing 17. Projection 69 serves as a manual actuator which permits the motor vehicle operator to switch the mirror between its "normal" and "adjusted" positions whenever electromagnet 31 is not energized. Translation of projection 69 to the left or right produces concomitant translation of cam 55 and therefore selectively tilts housing 17 as described with reference to electromagnetic-induced translation of the cam.

The control circuit for electromagnet 31 is located in section 29 of housing 17 and includes the components on circuit board 33, a fuse 71 (optional), a switch $S_1$, and a second photocell $P_2$. Photocell $P_2$ is mounted on the right side wall of housing 17 and monitors ambient light through a suitably provided window in the housing. By directing photocell $P_2$ to face the right-hand side of the vehicle, the effects of both oncoming and passing headlights are avoided and the photocell is able to more realistically monitor ambient light. Switch $S_1$ includes an actuator (knob, toggle, etc.) 32a which extends through a suitable opening at the bottom of housing 17 to permit the vehicle operator to deactivate the control circuit, thereby cutting off current to electromagnet 31 and permitting manual selection of the "adjusted" and "normal" mirror positions by means of projection 69.

Figure 5:
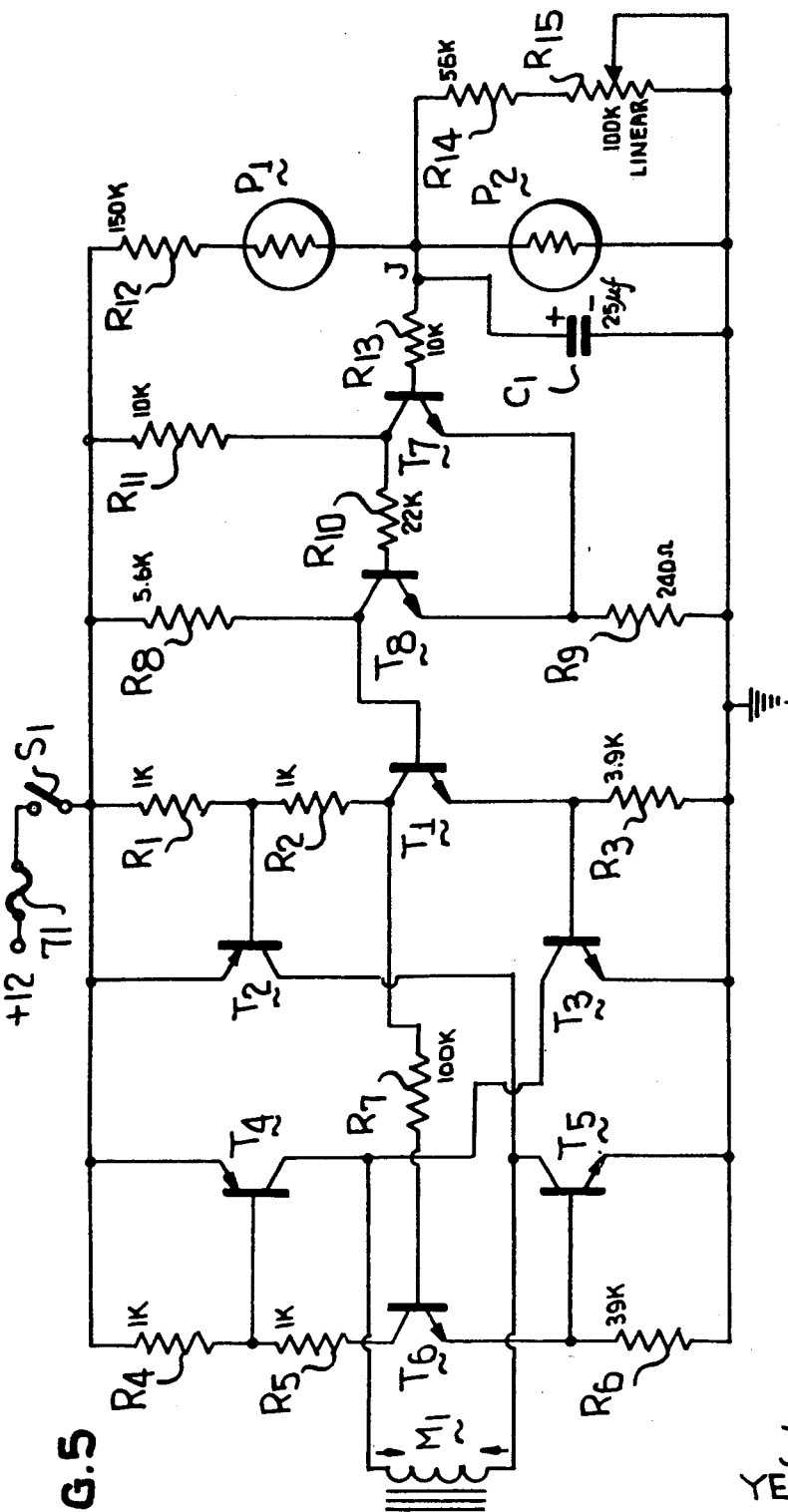
FIG. 5 is a schematic illustration of a control circuit for the mirror of FIG. 1.

Operation of the control circuit is best understood with reference to FIG. 5. The circuit is supplied by +12 volts DC from the motor vehicle battery through fuse 71 and switch $S_1$ in series. A bistable circuit includes four NPN transistors $T_1$, $T_3$, $T_5$ and $T_6$ and two PNP transistors $T_2$ and $T_4$. The collector of $T_1$ is connected to switch $S_1$ via series resistors $R_1$ and $R_2$; the emitter of $T_1$ is connected to ground via resistor $R_3$. In similar manner, a series circuit is provided between $S_1$ and ground via resistors $R_4$ and $R_5$, the collector-emitter circuit of $T_6$, and resistor $R_6$ in the order recited. The emitters of $T_2$ and $T_4$ are connected to $S_1$ and their collectors are connected to the collectors of $T_5$ and $T_3$, respectively. The base of $T_2$ is tied to the junction between $R_1$ and $R_2$; the base of $T_4$ is tied to the junction between $R_4$ and $R_5$. The emitters of $T_5$ and $T_3$ are grounded and their bases are connected to the emitters of $T_6$ and $T_1$, respectively. The collector of $T_1$ is connected to the base of $T_6$ via resistor $R_7$. Winding $M_1$ of electromagnet 31 is connected between the collectors of $T_2$ and $T_4$.

The operation of the circuit as thus far described is as follows: When $T_1$ is rendered conductive (as by application of a relatively positive voltage to its base) it renders $T_2$ and $T_3$ conductive while rendering $T_4$ and $T_5$ and $T_6$ non-conductive. In this condition, a current path is provided through the emitter-collector circuit of $T_2$, winding $M_1$, and the collector-emitter circuit of $T_3$. If, on the other hand, $T_1$ is rendered non-conductive (as by application of a relatively negative voltage to its base) it renders $T_2$ and $T_3$ non-conductive while rendering $T_4$, $T_5$ and $T_6$ conductive. In this condition a current path is provided by the emitter-collector circuit of $T_4$, winding $M_1$, and the collector emitter circuit of $T_5$. Importantly, the two aforementioned current paths cause current flow in opposite directions through winding $M_1$. In this manner electromagnet 31 is able to translate cam 55 to either of its two positions as described above.

The remainder of the control circuitry includes NPN transistors $T_7$ and $T_8$ which have their emitters coupled to ground via common emitter resistor $R_9$. The collectors of $T_7$ and $T_8$ are coupled to switch $S_1$ via resistors $R_{11}$ and $R_8$, respectively, the collector of $T_7$ being additionally coupled to the base of $T_8$ via series resistor $R_{10}$. The base of $T_7$ is connected to a circuit junction J through series resistor $R_{13}$. An integrating capacitor $C_1$ and photocell $P_2$ are connected in parallel between junction J and ground. Also connected between junction J and ground are series-connected resistor $R_{14}$ and potentiometer $R_{15}$. Junction J is connected to switch $S_1$ through series connected photocell $P_1$ and resistor $R_{12}$.

The operation of this portion of the circuit is as follows: if ambient light intensity is relatively low, the resistance of $P_2$ is high. The voltage at junction J is determined by the current through $P_1$ and therefore by the intensity of light impinging on the face of the mirror. If this light intensity is low, the resistance of $P_1$ is high and voltage at junction J is relatively low. $T_7$ is non-conductive and $T_8$ is conductive under these circumstances, thereby providing a relatively low voltage at the base of $T_1$ to maintain the latter non-conductive. As described above, this causes current flow in winding $M_1$ from top to bottom (as viewed in FIG. 5) and places the mirror in its "normal" position.

If the intensity of light impinging on the face of the mirror is high, the resistance of $P_1$ is low. This produces a relatively high voltage at junction J, rendering $T_7$ conductive and $T_8$ non-conductive. A relatively high voltage appears at the base of $T_1$ to effect current flow through winding $M_1$ from bottom to top. The mirror is thus switched to its "adjusted" position.

If ambient light intensity is high, the resistance of $P_2$ is low, and therefore junction J is maintained at a relatively low voltage. $T_7$ is thus rendered non-conductive, regardless of the condition of $P_1$, and the resulting current flow in winding $M_1$ is from top to bottom. The mirror is thus maintained in its "normal" position.

Potentiometer $R_{15}$ is adjustable to permit $T_7$ to switch at different resistance values of $P_2$. In this way, each motor vehicle operator can select the ambient light conditions at which he or she desires to render the mirror position automatically operative in response to the intensity of light impinging on the front of the mirror.

Capacitor $C_1$ and resistor $R_{13}$ act as a transient suppression network which prevents short term voltage increases at junction J (about one second, or less) from triggering $T_7$ into conduction. In this manner, short term increases of light intensity at the mirror surface are prevented from switching the mirror to its "adjusted" position.

Figure 6:
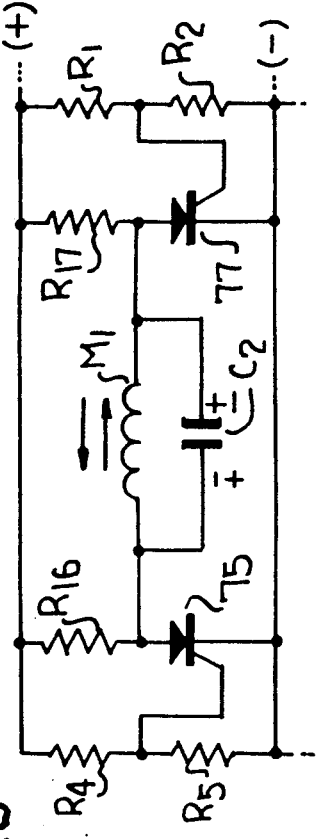
FIG. 6 is a partial schematic drawing illustrating an alternative section of the circuit of FIG. 5.

An alternative portion of the circuit of FIG. 5 is illustrated in FIG. 6. In this embodiment transistors $T_2$ and $T_3$ are replaced by a silicon controlled rectifier (SCR) 77 and transistors $T_4$ and $T_5$ are replaced by SCR 75. SCR's 75 and 77 have respective current-limiting resistors $R_{16}$ and $R_{17}$ connected between their anodes and $S_1$. In addition a capacitor $C_2$ is connected across winding $M_1$. The remainder of the circuit is the same as in FIG. 5.

One or the other of SCR's 75 and 77 is always conducting and the other non-conducting as long as $S_1$ is closed. Assume, for example, that SCR 77 is conducting. Current thus flows through winding $M_1$ in a left to right direction as viewed in FIG. 6. In addition capacitor $C_2$ accumulates a charge (plus to minus) from left to right, with the anode of SCR 77 sitting at approximately ground. This condition is initiated whenever SCR 77 experiences a voltage increase at its gate electrode, a situation which occurs when $T_1$ (FIG. 5) is rendered non-conductive and increases the voltage at the junction between $R_1$ and $R_2$. As described above, $T_1$ and $T_6$ are always in opposite states of conductivity so that when the junction between $R_1$ and $R_2$ is at high voltage, the junction between $R_4$ and $R_5$ is at low voltage. Thus the gage electrode of SCR 75 is maintained at low voltage and does not conduct.

Assume now that light conditions render $T_1$ conductive to in turn render $T_6$ non-conductive. The voltage at the gate electrode of SCR 75 increases to render the latter conductive. This causes an immediate voltage reduction at the anode of SCR 75 which is now essentially at ground potential. Since the voltage across $C_2$ cannot change instantaneously, the anode of SCR 77 also experiences a sudden voltage reduction to a level below ground potential. This renders SCR 77 non-conductive and permits current flow from right to left through winding $M_1$. In addition, $C_2$ begins to accumulate a positive charge, right to left, so that it may act to turn off SCR 75 when SCR 77 is next triggered on.

The circuit of FIG. 5 and its modified version in FIG. 6 both act to cause current to flow through winding $M_1$, in one direction or the other, continuously so long as $S_1$ is closed. The electromagnet 31 is therefore continuously acting to lock cam 55 in one or the other of its positions.

It will be appreciated, of course, that in consequence if the manual and/or magnetic detenting provided by the present structure the motor vehicle operator can manually rotate housing 17 and plate 45 about ball 51 to optimally position the mirror to his or her liking. Switching of the housing 17 about plate 45 between "normal" to "adjusted" positions can then proceed, using this optimum position as a reference.

Whereas the present invention in its preferred form employs a mirror of the type wherein the housing 17 is switched relative to a fixed interior plate 45, it is clear that the principles of the present invention are applicable to other types of rear-view mirrors. For example, a mirror of the type disciosed in U.S. Pat. No. 3,075,430 causes a prismoidal mirror panel to switch between "-normal" and "adjusted" positions within the fixed mirror housing. For such a mirror, electromagnet 31 could be linked (by armatures 37, 39, rod 57, and cam 55) to a projection such as projection 53 which would extend from the movable mirror panel.

While we have described and illustrated several specific embodiments of my invention, it will be clear that variations of the details of construction which are specifically illustrated and described may be resorted to without departing from the true spirit and scope of the invention as defined in the appended claims.

We claim:

1. A rear view mirror for a vehicle wherein a reflective panel is selectively movable between two stable positions relative to said vehicle for providing a relatively bright reflected image in a first position and relatively weak reflected image in a second position, said mirror including:

electromagnet means, including a single core, a current winding about said core and at least one permanent magnet armature, and responsive to current flow in one direction through said winding for magnetically retaining said armature at one location and responsive to current flow through said winding in a second direction for maintaining said armature at a second location;

linkage means responsive to said armature in said first location for moving and mechanically detenting said reflective panel to said first position and responsive to said armature in said second location for moving and mechanically detenting said reflective panel to said second position;

photo-sensitive means for sensing the intensity of light impinging upon said reflective panel;

electrical circuit means for providing current through said windinG in said one direction in response to intensities sensed by said photo-sensitive means below a predetermined intensity, and for providing current through said winding in said second direction in response to intensities sensed by said photo-sensitive means above said predetermined intensity.

2. The combination according to claim 1 further comprising:

additional photo-sensitive means for sensing the intensity of ambient light; and means responsive to light intensities above a further predetermined intensity sensed by said additional photo-sensitive means for maintaining current flow through said winding in said one direction.

3. The combination according to claim 2 further comprising adjustable means for varying said further predetermined intensity.

4. The combination according to claim 2 wherein said additional photo-sensitive means comprises a photocell mounted to sense the ambient light intensity to the adjacent curb side of the motor vehicle operator.

5. The combination according to claim 2 wherein said electrical circuit means comprises:

a source of DC voltage;

a first current path including the collector-emitter circuits of a first pair of opposite-type transistors connected to opposite ends of said winding and in series between said source of DC voltage and ground;

a second current path including the collector-emitter circuits of a second pair of opposite type transistors connected to opposite ends of said winding and in series between said source of DC voltage and ground, said first and second current paths being arranged to conduct current through said winding in opposite directions; and control means responsive to intensities sensed by said photo-sensitive means below said predetermined intensity for rendering said first pair of transistors conductive and said second pair of transistors non-conductive, and responsive to intensities sensed by said photo-sensitive means above said predetermined intensity for rendering said second pair of transistors conductive and said first pair of transistors non-conductive.

6. The combination according to claim 5 wherein said control means includes transient suppression means to prevent relatively short variations of intensities sensed by said photo-sensitive means from changing the conductivity states of said first and second pairs of transistors.

7. The combination according to claim 2 wherein said electrical circuit means comprises:
a source of DC voltage;
first and second silicon controlled rectifiers having anode, cathode and gate electrodes;
means for connecting opposite ends of said winding to respective ones of said anode electrodes;
a charging capacitor connected in parallel with said winding;
first and second anode resistors;
means for connecting the cathodes of said silicon controlled rectifiers to ground;
means for connecting the anodes of said first and second silicon controlled rectifiers in series with said first and second anode resistors, respectively, and said source of DC voltage;
means responsive to intensities sensed by said photo-sensitive means below said predetermined intensity for rendering said first silicon controlled rectifier conductive and said second silicon controlled rectifier non-conductive, and responsive to intensities sensed by said photo-sensitive means above said predetermined intensity for rendering said second silicon controlled rectifier conductive and said first silicon controlled rectifier non-conductive.

8. The combination according to claim 2 wherein said armature comprises: said at least one and a second permanent magnet disposed for translation between first and second locations in accordance with the direction of current through said winding, said at least one and said second permanent magnets being disposed at opposite ends of said single core with like poles facing one another; and means for mechanically linking said magnets to one another to prevent mutual displacement thereof.

9. The combination according to claim 2 wherein said mirror includes a housing, means for securing said reflective panel and said core to said housing to prevent their movement relative to said housing, and a plate mounted interiorly of said housing for pivotal movement relative to said housing in a direction generally perpendicular to said reflective panel; and further comprising means for securing said plate to said vehicle; and wherein said linkage means comprises a projection extending from said plate and a slotted cam extending from and movable with said armature, the slot of said cam being configured to engage and mechanically detent said projection in first and second positions relative to said housing when said armature is in said first and second locations respectively.

10. The combination according to claim 9 wherein said projection is of generally rectangular cross-section, wherein the slot of said cam member extends in the plane of motion of said cam, said plane being perpendicular to said projection, and wherein said slot includes:

A first section of generally rectangular cross-section arranged to engage said projection when said armature is in said first location;

a second section of generally rectangular cross-section arranged to engage said projection when said armature is in said second location, said first and second sections being disposed at opposite ends of said slot and at different distances from said mirror panel; and a third section interconnecting said first and second sections, inclined relative to said mirror panel, and arranged for guiding said projection between said first and second sections during translation of said armature between said first and second locations.

11. In combination, a mirror, a camming device having a translatable cam and a cam follower, a pivot secured to said mirror about which said mirror oscillates angularly between two limiting positions, means linking said cam follower to said mirror so that said mirror oscillates angularly between said two limiting positions as said cam translates between two limiting positions and said cam follower correspondingly moves between two limiting positions, a reversible solenoidal motor connected to drive said translatable cam between its two limiting positions, a photoelectrically controlled bistable flip-flop circuit control system, including an ambient light sensing photo-resistor and a directionally sensitive light sensing photo-resistor, and means responsive to said control system for energizing said motor to actuate said cam to move between its two limiting positions in response to only high intensity light impacting on said last mentioned photo-resistor while low intensities of ambient light are sensed by both said photo-resistors.

12. The combination according to claim 11, wherein said camming device includes mechanical latching means for mechanically latching said cam follower in its limiting positions.

13. The combination according to claim 11, wherein said camming device includes permanent magnet latchinG means for magnetically latching said follower in its limiting positions.

14. The combination according to claim 11, wherein said camming device includes mechanical latching means for mechanically latching said cam follower in its limiting positions, and wherein said camming device further includes permanent magnet latching means for magnetically latching said follower in its limiting positions.

15. In combination, a mirror facing rearwardly of a vehicle, a camming device having a translatable cam and a cam follower movable transversely of the direction of translation of said translatable cam, a pivot, said mirror being secured in pivotable relation to said pivot, means securing said cam follower directly to said mirror so as to move said mirror angularly about said pivot between limiting positions in response to translation of said cam and corresponding transverse movement of said cam follower between limiting positions, bistable photoelectrically controlled motor means connected to drive said cam in alternative senses towards its limiting positions in response to a function of ambient light conditionS and the presence or absence of light arriving adjacent said mirror from only rearwardly of said vehicle.

16. The combination according to claim 15, wherein said camming device includes mechanical latching means for retaining said cam follower in each of its limiting positions.

17. The combination according to claim 15, wherein said camming device includes permanent magnet latching means for retaining said translatable cam in each of its limiting positions.

18. The combination according to claim 15, wherein said camming device includes mechanical and also permanent magnet latching means for retaining said cam follower in its limiting positions and for retaining said cam in its limiting positions.

19. The combination according to claim 15, wherein said bistable photoelectrically controlled motor means includes a solenoidal motor having a translatable armature coupled directly to said cam, and wherein said solenoidal motor further includes winding means arranged to drive said armature selectively in said alternative senses.

20. The combination according to claim 15, wherein said bistable photoelectrically controlled motor means includes two photo-resistors, a first of said photo-resistors looking sidewise of said vehicle and a second of said photo-resiStors looking rearwardly of said vehicle, means including in parallel with said first photo-resistor a variable resistance having a value greater than the illuminated resistance and less than the unilluminated resistance of said first photo-resistor, means connecting in series with said second of said photo-resistors, a further resistance having a value less than the unilluminated resistance and greater than the illuminated resistance of said second of said photo-resistors, means connecting said photo-resistors and resistors across a d.c. voltage source, and solid state circuitry responsive to voltage across said first photo-resistor for controlling current to said coil means.

21. The combination according to claim 20, wherein said coil means is a single coil responsive to currents of opposite directivities in said coil to drive said armature in opposite senses.

22. A photocell motor control circuit for a day-night mirror comprising, a motor, a first circuit including a first photoelectric cell exposed to ambient light but not to light directed in a predetermined direction, a second circuit including a second photoelectric cell exposed to said ambient light and also to said light directed only in said predetermined direction, a source of voltage providing electric current, means connecting said circuits in series across said source of voltage and providing a junction between said circuits, a bistable transistor circuit having a transistor base connected to said junction, means driving said bistable circuit into one or another of its stable states accordingly as said junction rises or falls to a predetermined level with respect to the level of a pole of said source of voltage, transistor switching circuits for conveying current selectively from said source of voltage to said motor so as to drive said motor in opposition senses, selectively, means responsive to said bistable circuit according to its state to control said transistor switching circuits to convey said current to said motor in said opposite senses, and a reflective panel movable in alternate directions in response to driving of said motor in said alternate senses.

23. The combination according to claim 22, wherein is provided a resistive circuit connected only across said first photo-electric circuit and having a resistance greater than the resistance of said photoelectric cell when illuminated by said ambient light and less than the resistance of said photoelectric cell when dark.

24. A photoelectric cell control circuit, comprising means connecting two photoelectric cells in series across a source of voltage to establish a junction between said photoelectric cells which has a voltage determined by the relative intensities of illuminations of said photoelectric cells, a first transistor having a first gate electrode and two further first electrodes, a second transistor having a second gate electrode and two further second electrodes, means individually connecting said transistors in parallel across said source of voltage via resistances connected directly between said further electrodes and said source of voltage, means connecting said second gate electrode to one of said first further electrodes, means connecting said first gate electrode to said junction, a DC motor, and means responsive to the value of voltage of one of said further second electrodes for driving said motor in alternate senses according as said value is greater or less than a predetermined amount, a mirror panel, and means mounting said mirror panel to move to either of two limiting positions in respect to actuation by said motor in said alternate senses.

25. A rear view mirror system for a vehicle, wherein a panel is selectively movable between two stable positions relative to said vehicle for providing via said mirror system at a viewing location a relatively bright reflected image in a first position of said panel and relatively weak reflected image in a second position of said panel, said mirror system including a motor, said motor including an armature movable in opposite senses in response to oppositely directed currents applied to said motor means responsive to said armature in moving in said first sense for moving said panel to said first position and responsive to said armature in moving in said second sense for moving said reflective panel to said second position; photo-sensitive means for sensing the intensity of light directed toward said reflective panel in comparison with ambient light intensity; electrical circuit means for directing current through said motor in one direction in response to intensities sensed by said photo-sensitive means below a predetermined intensity, and for directing current through said motor in an opposite sense in response to intensities sensed by said photo-sensitive means above said predetermined intensity.

* * * * *